United States Patent
Okumura et al.

(10) Patent No.: US 7,086,763 B2
(45) Date of Patent: Aug. 8, 2006

(54) APPARATUS FOR AUTOMATICALLY ADJUSTING DIRECTION OF LIGHT AXIS OF VEHICLE HEADLIGHT

(75) Inventors: Kazuhisa Okumura, Kariya (JP); Kenichi Nishimura, Gifu (JP)

(73) Assignee: Denso Corporation, Kariya (JP)

( * ) Notice: Subject to any disclaimer, the term of this patent is extended or adjusted under 35 U.S.C. 154(b) by 162 days.

(21) Appl. No.: 10/926,031

(22) Filed: Aug. 26, 2004

(65) Prior Publication Data
US 2005/0047152 A1    Mar. 3, 2005

(30) Foreign Application Priority Data
Aug. 28, 2003 (JP) ............................. 2003-304766
May 21, 2004 (JP) ............................. 2004-151228

(51) Int. Cl.
  *B60Q 1/10* (2006.01)
  *B60Q 1/08* (2006.01)
(52) U.S. Cl. .................... 362/466; 362/467; 701/49
(58) Field of Classification Search ............... 362/466, 362/464, 467; 701/49
See application file for complete search history.

(56) References Cited

U.S. PATENT DOCUMENTS 6,193,398 B1 * 2/2001 Okuchi et al. ............... 362/466
6,389,344 B1 * 5/2002 Nishimura et al. ........... 701/49
6,572,248 B1 * 6/2003 Okuchi et al. ............... 362/464
2002/0003473 A1    1/2002 Makita et al.

FOREIGN PATENT DOCUMENTS

| EP | 0965487 A3 | 10/2001 |
|---|---|---|
| JP | 2000-142213 | 5/2000 |
| JP | 2002-19517 | 1/2002 |
| JP | 2002-234383 | 8/2002 |

* cited by examiner

*Primary Examiner*—Alan Cariaso
*Assistant Examiner*—James W Cranson, Jr.
(74) *Attorney, Agent, or Firm*—Posz Law Group, PLC

(57) ABSTRACT

The apparatus for adjusting a direction of a light axis of a vehicle headlight includes a vehicle height sensor, and an inclination calculating unit for calculating, on the basis of an output of the vehicle height sensor, inclination of the direction of the light axis of the vehicle headlight to a horizontal plane by using an approximating curve. The approximating curve is constituted by three straight line segments lying in first, second and third regions respectively. These three straight line segments which are jointed to one another have different slopes. The first region corresponds to a load condition where all seats of the vehicle are occupied and the vehicle is loaded with 30 to 50% of its maximum loading capacity, the second region corresponds to a load condition where all the seats of the vehicle are occupied and the vehicle is loaded with 90% or more of its maximum loading capacity. The third region is a region interposed between the first region and the second region.

5 Claims, 5 Drawing Sheets

APPARATUS FOR AUTOMATICALLY ADJUSTING DIRECTION OF LIGHT AXIS OF VEHICLE HEADLIGHT

BACKGROUND OF THE INVENTION

1. Field of the Invention

The present invention relates to an apparatus for automatically adjusting a direction of a light axis of a vehicle headlight.

2. Description of the Background Art

Automatically adjusting a direction of a light axis of a vehicle headlight is known as disclosed in Japanese Patent Application Laid-Open No. 2000-142213. This document describes a technique for automatically adjusting a direction of a light axis of a vehicle headlight in accordance with an output of a single vehicle-height sensor while taking account of variable load conditions.

To be more specific, this technique uses an approximating curve divided into an occupant-load region and a trunk-load region in order to estimate an inclination of the light axis of the vehicle headlight to the horizontal plane for each of two different load conditions. That is because the amount and direction of the inclination of the light axis of the vehicle headlight to the horizontal plane varies differently depending on the load conditions (occupant load, trunk load, or combination of them). So, the approximating curve is constituted by two straight line segments having different slopes corresponding to the occupant-load region and the trunk-load region respectively.

The slope of the straight line segment in the trunk-load region is steeper than that of the straight line segment in the occupant-load region. However, this technique has a problem in that the difference between the pitch angle corresponding to the inclination of the light axis of the vehicle headlight to the horizontal plane estimated on the basis of the output of the vehicle-height sensor and the actual pitch angle becomes large when the vehicle is under the trunk-load condition, especially when the vehicle is nearly fully loaded, and all the seats of the vehicle are occupied, which may cause a large error to occur in adjusting the direction of the light axis of the vehicle headlight on the basis of the estimated pitch angle.

Incidentally, it is also known to switch between two approximating curves having different slopes depending on whether the front passenger's seat is occupied or not for estimating the pitch angle. However, in this case, since a seat sensor for sensing presence of a passenger and a circuit relevant to this seat sensor are required, the production costs are increased.

SUMMARY OF THE INVENTION

The present invention has been made in light of the above-described problems with an object of providing at low cost an apparatus capable of automatically adjusting a direction of a light axis of a vehicle headlight with higher precision on the basis of an output from a single vehicle-height sensor in various load conditions.

In one aspect of the invention, the apparatus for adjusting a direction of a light axis of a vehicle headlight has a structure including;

a vehicle height sensor mounted on a vehicle for detecting a displacement of a vehicle height;

an inclination calculating unit for calculating, on the basis of an output of the vehicle height sensor, inclination of the direction of the light axis of the vehicle headlight to a horizontal plane by using an approximating curve constituted by three straight line segments lying in first, second and third regions respectively, the three straight line segments having different slopes and being jointed to one another, the first region corresponding to a load condition where all seats of the vehicle are occupied and the vehicle is loaded with 30 to 50% of a maximum loading capacity thereof, the second region corresponding to a load condition where all the seats of the vehicle are occupied and the vehicle is loaded with 90% or more of the maximum loading capacity thereof, the third region being a region interposed between the first region and the second region; and a light-axis-direction adjusting unit for adjusting the direction of the light axis of the vehicle headlight in accordance with the inclination calculated by the inclination calculating unit.

With this structure, it is possible to match the approximating curve to the actual relationship between the vehicle height and the inclination better than ever before, and so it becomes possible to adjust the direction of the light axis of the headlight without being affected much by variation of installation position of the vehicle height sensor.

In the above structure, when an absolute value of the slope of the straight line segment lying in the first region is $\alpha$ and an absolute value of the slope of the straight line segment lying in the third region is $\beta$, a relationship of $\alpha<\beta$ may hold.

In the above structure, when an absolute value of the slope of the straight line segment lying in the first region is $\alpha$, an absolute value of the slope of the straight line segment lying in the third region is $\beta$, and an absolute value of the slope of the straight line segment lying in the second region is $\gamma$, a relationship of $\gamma \leqq \alpha < \beta$ may hold.

In another aspect of the invention, the apparatus for adjusting a direction of a light axis of a vehicle headlight has a structure including;

a vehicle height sensor to be mounted on a vehicle for detecting a displacement of a vehicle height;

an inclination calculating unit for calculating, on the basis of an output of the vehicle height sensor, inclination of the direction of the light axis of the vehicle headlight to a horizontal plane by using an approximating curve constituted by at least three straight line segments having different slopes and jointed to one another, the straight line segments lying in a region surrounded by an approximating curve suitable for a load condition where a driver's seat of the vehicle is occupied and a passenger's seat of the vehicle is not occupied and an approximating curve suitable for a load condition where the drivers' seat and the passenger's seat are both occupied; and a light-axis-direction adjusting unit for adjusting the direction of the light axis of the vehicle headlight in accordance with the inclination calculated by the inclination calculating unit.

With this structure, a seat sensor for sensing whether the passenger's seat is occupied or not and a circuit relevant to this seat sensor become unnecessary.

In still another aspect of the invention, the apparatus for adjusting a direction of a light axis of a headlight of a vehicle has a structure including;

a vehicle height sensor to be mounted on a vehicle for detecting a depression of a suspension of the vehicle as a displacement of a vehicle height, a load-depression characteristic curve of the suspension being constituted by a straight line segment and a curved line segment which are jointed to each other at an inflection point;

an inclination calculating unit for calculating, on the basis of an output of the vehicle height sensor, inclination of the direction of the light axis of the headlight to a horizontal plane by using an approximating curve constituted by a straight line segment and a curved line segment jointed to each other which correspond to the straight line segment and the curved line segment constituting the load-depression characteristic curve of the suspension respectively; and a light axis direction adjusting unit for adjusting the direction of the light axis of the headlight in accordance with the inclination calculated by the inclination calculating unit.

With the third embodiment, even if the load-depression characteristic curve of the suspension of the vehicle has an inflection point, it is possible to properly adjust the direction of the light axis of the headlight which depends on the vehicle attitude determined by the load condition on the basis of the output of the vehicle height sensor.

PREFERRED EMBODIMENTS OF THE INVENTION

Figure 1:
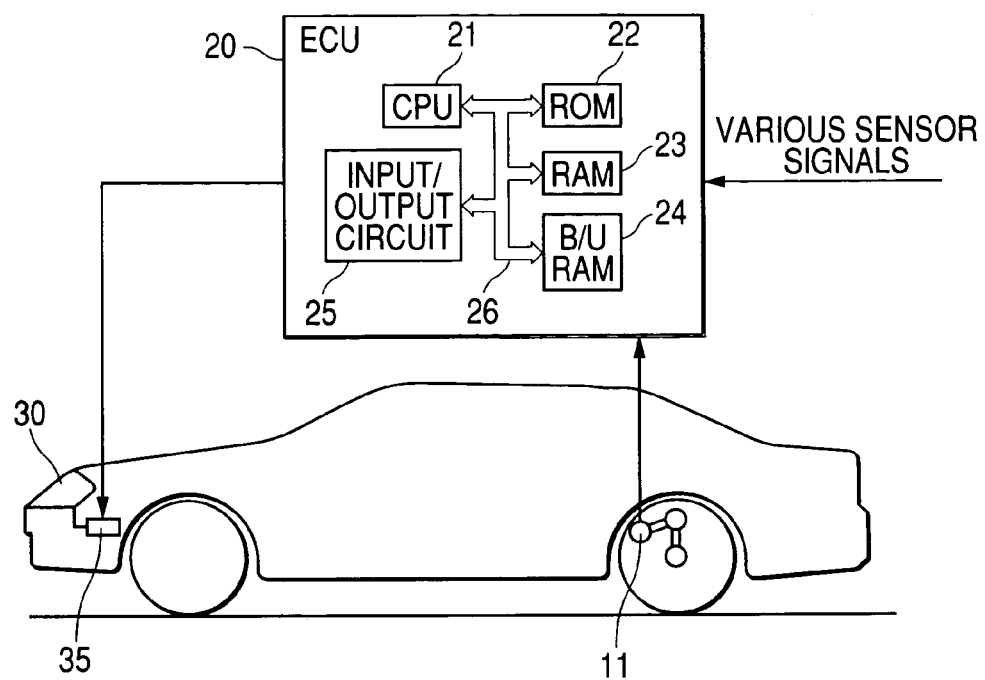
FIG. 1 is a schematic view of a structure of an apparatus for automatically adjusting a direction of a light axis of a vehicle headlight according to a first embodiment of the present invention.

FIG. 1 is a schematic view of a structure of an apparatus for automatically adjusting a direction of a light axis of a vehicle headlight according to a first embodiment of the present invention. This apparatus is constituted by a vehicle-height sensor 11, an ECU (Electronic Control Unit) 20, and an actuator 35.

The vehicle-height sensor 11 is installed on a rear axle behind the driver's seat or front passenger's seat.

The ECU 20 receives a rear-vehicle-height value HR indicative of relative displacement between the rear axle and the vehicle body (vehicle height displacement) output from the vehicle-height sensor 11 and various signals from other not-illustrated sensors. Although the ECU 20 is shown outside the vehicle in FIG. 1 for the sake of convenience, it is actually installed within the vehicle.

The ECU 20 is constituted by a CPU 21 for performing various processings, a ROM 22 for storing control programs and control maps etc, a RAM 23 for storing various data, a backup RAM 24, an input-output circuit 25, and a bus line 26 for connecting these elements. The actuator 35 disposed in the vicinity of a headlight 30 adjusts the direction of the light axis of the headlight 30 in accordance with a signal received from the ECU 20.

Figure 2:
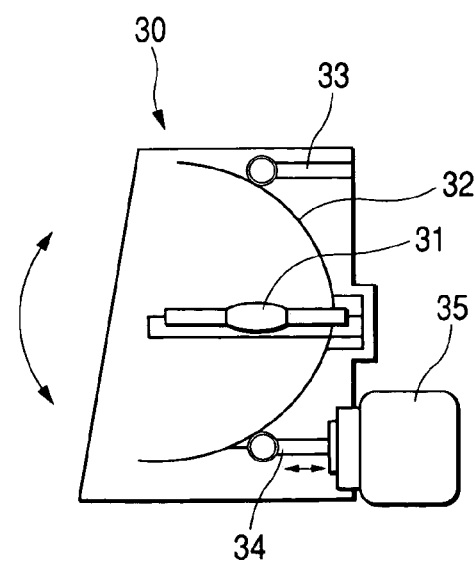
FIG. 2 is a schematic cross-sectional diagram of the headlight shown in FIG. 1.

FIG. 2 is a schematic cross-sectional diagram of the headlight 30. The headlight 30 is constituted mainly by a lamp 31, a reflector 32 within which the lamp 31 is fixed, a holding member 33 holding the reflector 32 while allowing the reflector 32 to swing along the direction of the circular arrow shown in FIG. 2, a movable member 34 holding the reflector 32 and being movable in the direction shown in the straight arrow shown in FIG. 2, and a stepping motor 35 capable of pushing and pulling the movable member 34 in the directions of the straight arrow. The direction of the light axis of the headlight 30 is initially set at a value that conforms to a condition where only a driver sits on the driver's seat.

Figure 3:
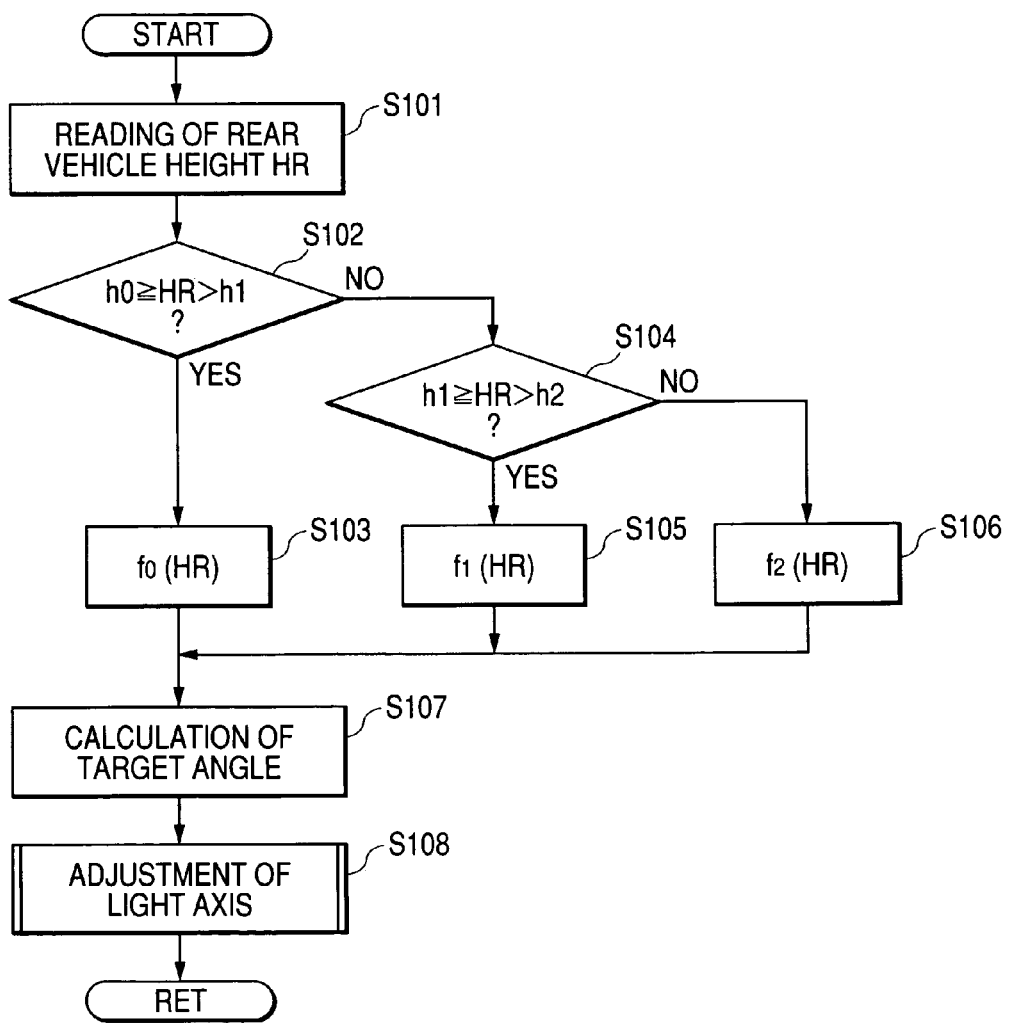
FIG. 3 is a flowchart explaining the operation of the CPU of the ECU for use in the apparatus for automatically adjusting a direction of a light axis of a vehicle headlight according to the first embodiment.

Next, the operation (control routine) which the CPU 21 of the ECU 20 performs for adjusting the direction of the light axis of the headlight 30 will be explained with reference to the flowchart shown in FIG. 3 and the line graph shown in FIG. 4. The CPU 21 performs this control routine at regular intervals.

Here, it is assumed that the vehicle is a sedan whose trunk is behind its rear suspension. The line graph shown in FIG. 4, which is used for estimating the pitch angle (degree) corresponding to the inclination of the light axis of the headlight to the horizontal plane on the basis of the rear vehicle height (mm), is stored in the ROM 22 beforehand. The black rhombuses in FIG. 4 represent actually measured pitch angles in a condition where all the seats of the vehicle are occupied, and the white squares in FIG. 4 represent actually measured pitch angles in a condition where only the driver's seat of the vehicle is occupied.

In this embodiment, the pitch angle is estimated by linear approximation using an approximating curve (a heavy solid line in this line graph) constituted by three straight line segments f0(HR), f2(HR), f1(HR) having different slopes which lie in three regions (a first region, a third region, and a second region) respectively corresponding to three different load conditions. The first region corresponds to a load condition where all seats of the vehicle are occupied and the vehicle is loaded with 30 to 50% of its maximum loading capacity. The second region corresponds to a load condition where all the seats of the vehicle are occupied and the vehicle is loaded with 90% or more of its maximum loading capacity. The third region is a region interposed between the first and second regions.

In prior art, the pitch angle is estimated by linear approximation using another approximating curve (a chain line in this line graph) constituted by two straight line segments having different slopes which lie in the occupant-load region and the trunk-load region, respectively, corresponding to two different load conditions.

As shown in the flowchart, the rear vehicle height HR outputted from the vehicle height sensor 11 is read at step S101. Subsequently, it is checked whether or not the inequality of h0≧HR>h1 holds at step S102. In this embodiment, h0 is 40 mm, and h1 is −48 mm. If it is determined that the inequality of h0≧HR>h1 holds at step S102, that is, if it is determined that the rear vehicle height is within the first region, then the straight line segment f0(HR) corresponding to the first region is selected at step S103.

If it is determined that the inequality of h0≧HR>h1 does not hold at step S102, then it is checked whether or not the inequality of h1≧HR>h2 holds at step S104. In this embodiment, h2 is −57 mm. If it is determined that the inequality of h1≧HR>h2 holds at step S104, that is, if it is determined that the rear vehicle height is within the third region, then the straight line segment f1(HR) corresponding to the third region is selected at step S105. If it is determined that the inequality of h1≧HR>h2 does not hold at step S104, then the line segment f2(HR) corresponding to the second region is selected at step S106, assuming that the inequality of h2≧HR>h3 holds in this case. In this embodiment, h3 is −90 mm.

After that, the process goes to step S107 where the pitch angle θp is calculated on the basis of the rear vehicle height HR read at step S101 through linear approximation using the line segment selected at step S103, S105, or S106. Next, the process goes to step S108 where a target control angle θT (≈−θp) is calculated, and the actuator 35 swings the headlight 30 by the target control angle θ T to complete the light-axis adjusting routine.

Figure 4:
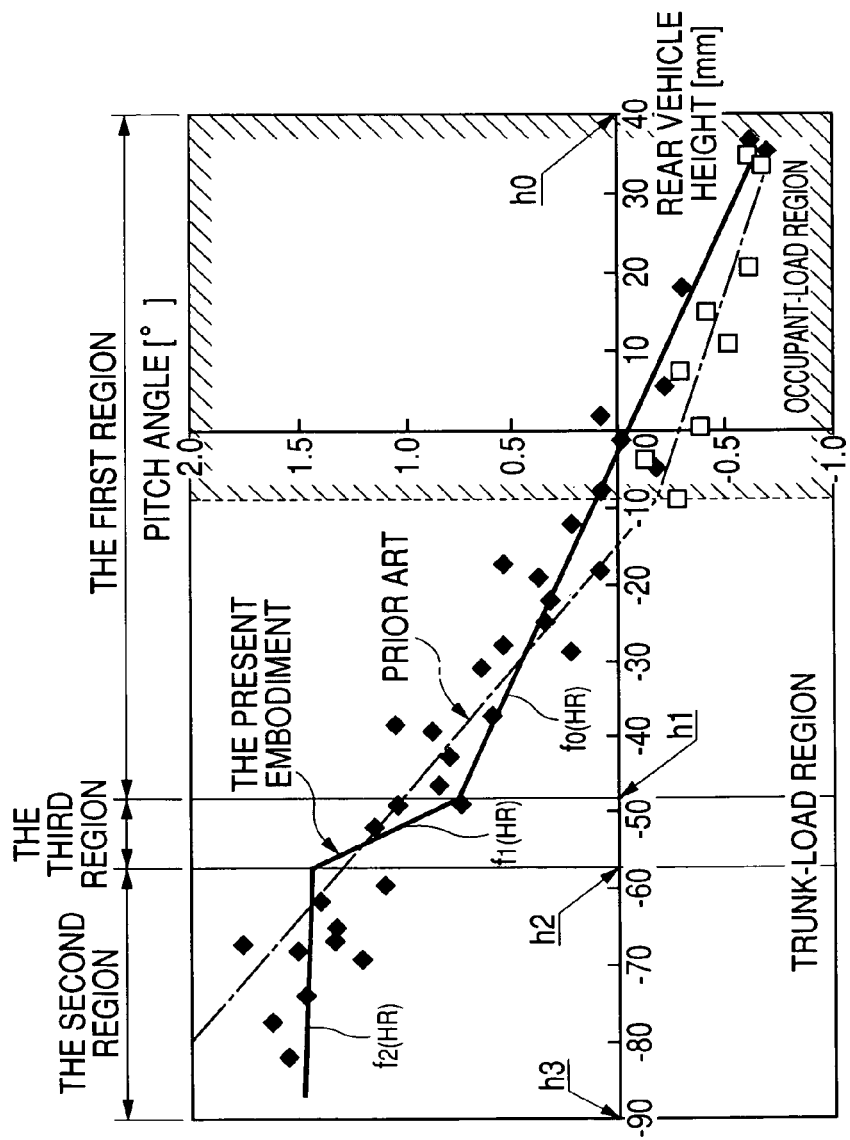
FIG. 4 is a line graph, divided into three regions, which is used for estimating a pitch angle on the basis of rear vehicle height in the first embodiment.

As seen from FIG. 4, if the pitch angle is estimated through linear approximation using the approximating curve represented by the chain line as is the case with the prior art, the difference between the estimated pitch angle and the actual pitch angle becomes large in a region where the rear vehicle height is lower than −60 mm. In this embodiment, the pitch angle is estimated through linear approximation using the approximating curve represented by the heavy solid line. Since the slope of the straight line segment of the third region is made steep and the slope of the straight line segment of the second region is made gentle, the estimated pitch angle is in good agreement with the actual pitch angle. Accordingly, it becomes possible to avoid a large error from arising in adjusting the direction of the light axis of the headlight 30 on the basis of the estimated pitch angle within the second region where all the seats of the vehicle are occupied and the vehicle is loaded with. 90% or more of its maximum loading capacity.

The points at which the straight line segments are jointed, that is, the points at each of which the straight line segment used is switched to another straight line segment with the output from the vehicle height sensor 11 may be set such that the differences between the estimated pitch angles and the actual pitch angles become small in a most frequently used range on a vehicle-by-vehicle basis.

As explained above, the apparatus for adjusting a direction of a light axis of a vehicle headlight according to the first embodiment of the invention includes;

a vehicle height sensor to be mounted on a vehicle for detecting a displacement of a vehicle height;

an inclination calculating unit (ECU 20) for calculating, on the basis of an output of the vehicle height sensor, inclination (pitch angle) of the direction of the light axis of the vehicle headlight to a horizontal plane by using an approximating curve constituted by three straight line segments lying in first, second and third regions respectively, the three straight line segments having different slopes and being jointed to one another, the first region corresponding to a load condition where all seats of the vehicle are occupied and the vehicle is loaded with 30 to 50% of a maximum loading capacity thereof, the second region corresponding to a load condition where all the seats of the vehicle are occupied and the vehicle is loaded with 90% or more of the maximum loading capacity thereof, the third region being a region interposed between the first region and the second region; and a light axis direction adjusting unit (actuator 35) for adjusting the direction of the light axis of the vehicle headlight in accordance with the inclination calculated by the inclination calculating unit.

As described above, in the first embodiment, the pitch angle corresponding to the inclination of the light axis of the headlight 30 to the horizontal plane is estimated by linear approximation using the approximating curve in the line graph which is divided into the first, second, and third regions, the approximating curve being constituted by the three straight line segments (f0 (HR), f1 (HR), f2 (HR)) jointed to one another which lie within the first, second, and third regions respectively, and have different slopes corresponding to different load conditions. The direction of the light axis of the headlight 30 is adjusted in accordance with the estimated pitch angle. Accordingly, with this embodiment, it is possible to adjust the direction of the light axis of the headlight 30 without being affected much by variation of installation position of the vehicle height sensor 11 by properly setting the slopes of the straight line segments constituting the approximating curve.

In the first embodiment, when the absolute value of the slope of the straight line segment of the first region is α, that of the third region is β, and that of the second region is γ, the relationship of γ≦α<β holds.

The first embodiment is based on this relationship of γ≦α<β in order to properly adjust the direction of the light axis of the headlight 30 even in the load condition where the vehicle is nearly fully loaded and all the seats of the vehicle are occupied.

Although the third region is a region where the HR (rear vehicle height) changes from −48 mm (h1) to −57 mm (h2) in the first embodiment, it may be any region which satisfies the relationship of −80 mm<HR<0 mm (preferably −60 mm<HR<−30 mm).

Second Embodiment

Although, in the first embodiment, the pitch angle corresponding to the inclination of the headlight 30 to the horizontal plane is estimated through linear approximation with the rear vehicle height HR output from the vehicle height sensor 11 by use of the approximating curve constituted by three straight line segments which have different slopes corresponding to three different load conditions and are jointed to one another, the present invention should not be construed as being limited thereto.

Figure 5:
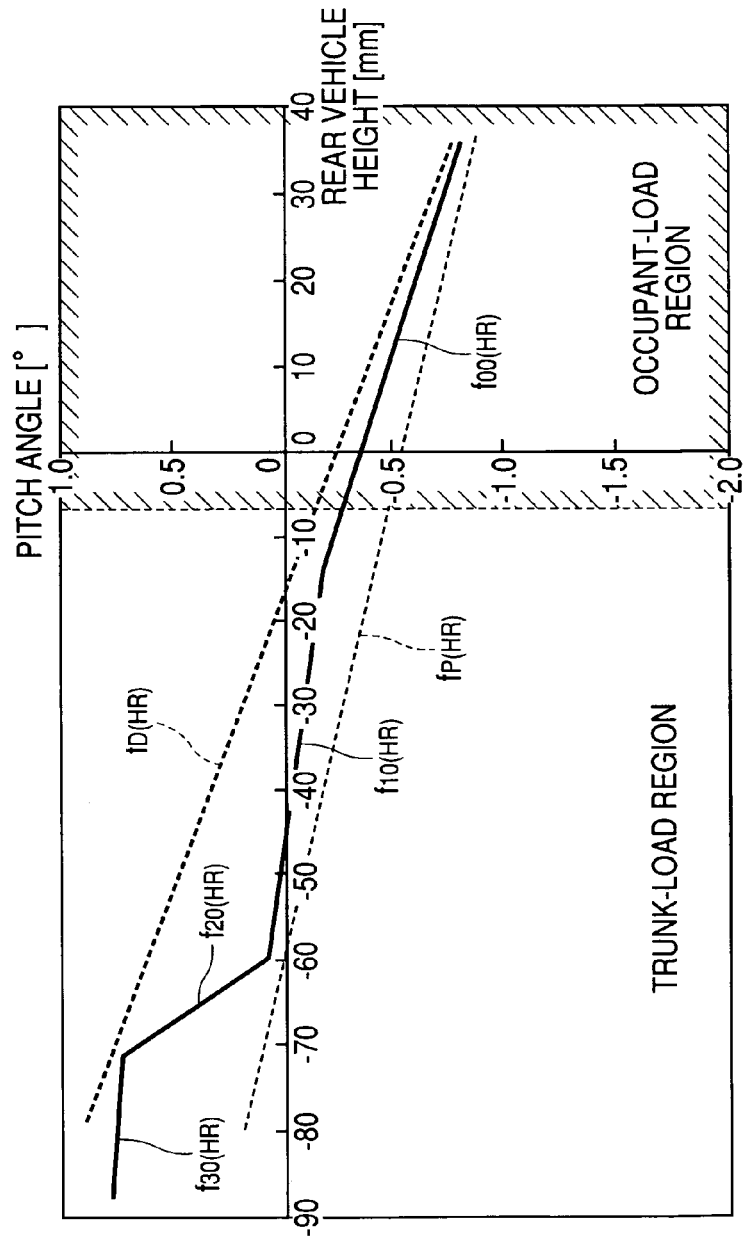
FIG. 5 is a line graph which is used for estimating a pitch angle on the basis of a rear vehicle height in an apparatus for automatically adjusting a direction of a light axis of a vehicle headlight according to a second embodiment of the present invention.

It is known to switch between two different approximating curves for estimating the pitch angle depending on the load conditions. For example, in FIG. 5, fD(HR) denotes an approximating curve suitable for a load condition where the driver's seat is occupied but the passenger's seat is not occupied, and fP(HR) denotes an approximating curve suitable for a load condition where the driver's seat and the passenger's seat are both occupied. The present invention is also applicable to such a case. In this case, at least three straight line segments (f00(HR), f10(HR), f20(HR), f30 (HR) in this embodiment) having different slopes and jointed to one another in this order within a region surrounded by the two approximating curves fD(HR), fP(HR) are used for estimating the pitch angle.

With the second embodiment, a seat sensor for sensing whether the passenger's seat is occupied or not and a circuit relevant to this seat sensor become unnecessary.

It is preferable to make the slope of the straight line segment f30 (HR) equal to the slope of the straight line segment f2 (HR) of the second region shown in FIG. 4 which is suitable for the load condition where the vehicle is loaded with 90% or more of its maximum loading capacity and all the seats of the vehicle are occupied. In this case, it becomes possible to adjust the direction of the light axis of the headlight without being affected much by variation of installation position of the vehicle height sensor as in the first embodiment.

As explained above, the apparatus for adjusting a direction of a light axis of a vehicle headlight according to the second embodiment of the invention includes;

a vehicle height sensor to be mounted on a vehicle for detecting a displacement of a vehicle height;

an inclination calculating unit for calculating, on the basis of an output of the vehicle height sensor, inclination of the direction of the light axis of the vehicle headlight to a horizontal plane by using an approximating curve constituted by at least three straight line segments having different slopes and jointed to one another, the straight line segments lying in a region surrounded by an approximating curve suitable for a load condition where a driver's seat of the vehicle is occupied and a passenger's seat of the vehicle is not occupied and an approximating curve suitable for a load condition where the drivers' seat and the passenger's seat are both occupied; and a light axis direction adjusting unit for adjusting the direction of the light axis of the vehicle headlight in accordance with the inclination calculated by the inclination calculating unit.

Although the vehicle height sensor 11 is located on the rear of the vehicle in the first and second embodiments, it may be located on the front of the vehicle, since the pitch angle corresponding to the inclination of the headlight to the horizontal plane can be estimated on the basis of the output of the vehicle height sensor 11 as far as a proper approximating curve is prestored in the ROM 22.

Figure 6:
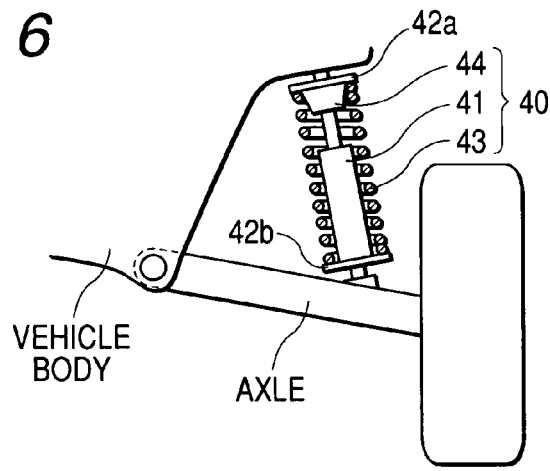
FIG. 6 is a schematic view showing a suspension and its vicinity in a vehicle on which the apparatus for the automatic adjustment of the light axis of the present invention is mounted.

FIG. 6 shows a suspension and its vicinity of a vehicle on which the apparatus for automatically adjusting a direction of a light axis of a vehicle headlight of the present invention is mounted.

In FIG. 6, 40 denotes a suspension 40 disposed between a vehicle body and a rear axle as a buffering/attenuating mechanism. The suspension 40 includes a shock absorber 41 doubling as a center shaft, a coil spring 43 disposed around the periphery of the shock absorber 41 and secured at its ends to a spring pedestal 42a on the vehicle body side and a spring pedestal 42b on the axle side, and a spring stopper 44 made of a rubber bushing disposed so as to hit the upper end of the shock absorber 41 and undergo elastic deformation when the depression of the coil spring 43 exceeds a predetermined value.

Figure 7:
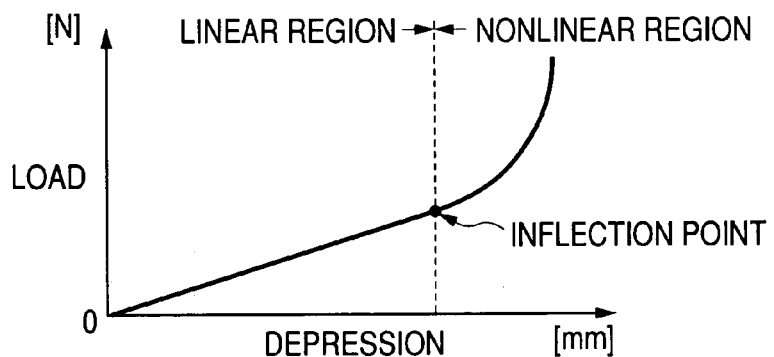
FIG. 7 is a graph representing load-depression characteristics of the suspension shown in FIG. 6.

The shock absorber 41 is for lessening impulsive shock, and it does not respond to depression of the coil spring 43 due to gentle load variation. The curve shown in FIG. 7 represents load (N: Newton)—depression (mm) characteristic of the suspension 40. As seen from FIG. 7, this curve has an inflection point. The region at the left of the inflection point is a linear region in which only the coil spring 43 expands or contracts with variations of the load, and the depression (sinking) of the coil spring 43 and the load applied to the coil spring 43 are in a linear relationship. The region at the right of the inflection point is a nonlinear region in which the upper end of the shock absorber 41 abuts against the spring stopper 44, and the depression of the coil spring 43 and the load applied to the coil spring 43 are in a nonlinear relationship since the elastic deformation of the coil spring 43 and the elastic deformation of the spring stopper 44 overlap one another.

The depression of the coil spring 43 of the suspension 40 is detected as a rear vehicle height indicative of a relative displacement between the rear axle and the vehicle body (vehicle height displacement) by a vehicle height sensor, not illustrated, mounted on the axle behind the driver's seat or passenger's seat.

Figure 8:
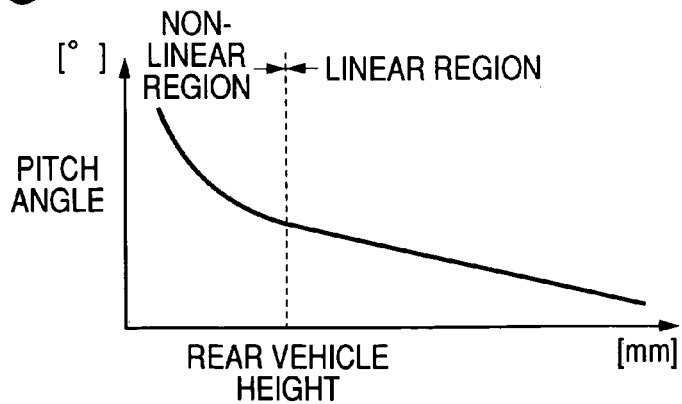
FIG. 8 is a graph defining the relationship between the pitch angle and the rear vehicle height in the vehicle having the suspension shown in FIG. 6.

In this embodiment, the pitch angle corresponding to the inclination of the headlight to the horizontal plane is estimated by using an approximating curve shown in FIG. 8 representing the relationship between the pitch angle and the rear vehicle height. This approximating curve includes a curved line segment within a nonlinear region which corresponds to a curved line segment at the right of the inflection point shown in FIG. 7 and a straight line segment within a linear region which corresponds to a straight line segment at the left of the inflection point shown in FIG. 7.

As explained above, the apparatus for adjusting a direction of a light axis of a headlight of a vehicle according to the third embodiment of the invention includes;

a vehicle height sensor to be mounted on a vehicle for detecting a depression of a suspension of the vehicle as a displacement of a vehicle height, a load-depression characteristic curve of the suspension being constituted by a straight line segment and a curved line segment which are jointed to each other at an inflection point;

an inclination calculating unit for calculating, on the basis of an output of the vehicle height sensor, inclination of the direction of the light axis of the vehicle headlight to a horizontal plane by using an approximating curve constituted by a straight line segment and a curved line segment jointed to each other which correspond to the straight line segment and the curved line segment constituting the load-depression characteristic curve of the suspension, respectively; and a light axis direction adjusting unit for adjusting the direction of the light axis of the vehicle headlight in accordance with the inclination calculated by the inclination calculating unit.

With the third embodiment, even if the load-depression characteristic curve of the suspension of the vehicle has an inflection point, it is possible to properly adjust the direction of the light axis of the headlight which depends on the vehicle attitude determined by the load condition on the basis of the output of the vehicle height sensor.

The above explained preferred embodiments are exemplary of the invention of the present application which is described solely by the claims appended below. It should be understood that modifications of the preferred embodiments may be made as would occur to one of skill in the art.

What is claimed is:

1. An apparatus for adjusting a direction of a light axis of a vehicle headlight comprising;

a vehicle height sensor to be mounted on a vehicle for detecting a displacement of a vehicle height;

an inclination calculating unit for calculating, on the basis of an output of said vehicle height sensor, inclination of said direction of said light axis of said vehicle headlight to a horizontal plane by using an approximating curve constituted by three straight line segments lying in first, second and third regions respectively, said three straight line segments having different slopes and being jointed to one another, said first region corresponding to a load condition where all seats of said vehicle are occupied and said vehicle is loaded with 30 to 50% of maximum loading capacity thereof, said second region corresponding to a load condition where all said seats of said vehicle are occupied and said vehicle is loaded with 90% or more of said maximum loading capacity, said third region being a region interposed between said first region and said second region; and a light axis direction adjusting unit for adjusting said direction of said light axis of said vehicle headlight in accordance with said inclination calculated by said inclination calculating unit.

2. An apparatus for adjusting a direction of a light axis of a vehicle headlight according to claim 1, in which, when an absolute value of said slope of said straight line segment lying in said first region is $\alpha$ and an absolute value of said slope of said straight line segment lying in said third region is $\beta$, a relationship of $\alpha < \beta$ holds.

3. An apparatus for adjusting a direction of a light axis of a vehicle headlight according to claim 1, in which, when an absolute value of said slope of said straight line segment lying in said first region is $\alpha$, an absolute value of said slope of said straight line segment lying in said third region is $\beta$, and an absolute value of said slope of said straight line segment lying in said second region is $\gamma$, a relationship of $\gamma \leq \alpha < \beta$ holds.

4. An apparatus for adjusting a direction of a light axis of a vehicle headlight comprising;

a vehicle height sensor to be mounted on a vehicle for detecting a displacement of a vehicle height;

an inclination calculating unit for calculating, on the basis of an output of said vehicle height sensor, inclination of said direction of said light axis of said vehicle headlight to a horizontal plane by using an approximating curve constituted by at least three straight line segments having different slopes and jointed to one another, said straight line segments lying in a region surrounded by an approximating curve suitable for a load condition where a driver's seat of said vehicle is occupied and a passenger's seat of said vehicle is not occupied and an approximating curve suitable for a load condition where said drivers' seat and said passenger's seat are both occupied; and a light-axis-direction adjusting unit for adjusting said direction of said light axis of said vehicle headlight in accordance with said inclination calculated by said inclination calculating unit.

5. An apparatus for adjusting a direction of a light axis of a headlight of a vehicle comprising;

a vehicle height sensor to be mounted on a vehicle for detecting a depression of a suspension of said vehicle as a displacement of a vehicle height, a load-depression characteristic curve of said suspension being constituted by a straight line segment and a curved line segment which are jointed to each other at an inflection point;

an inclination calculating unit for calculating, on the basis of an output of said vehicle height sensor, inclination of said direction of said light axis of said vehicle headlight to a horizontal plane by using an approximating curve constituted by a straight line segment and a curved line segment jointed to each other which correspond to said straight line segment and said curved line segment constituting said load-depression characteristic curve of said suspension respectively; and a light axis direction adjusting unit for adjusting said direction of said light axis of said vehicle headlight in accordance with said inclination calculated by said inclination calculating unit.

\* \* \* \* \*